(12) United States Patent
Rousseau

(10) Patent No.: US 8,306,069 B2
(45) Date of Patent: Nov. 6, 2012

(54) INTERLEAVED CRYPTOGRAPHIC SYNCHRONIZATION

(75) Inventor: Frederic Rousseau, Montigny le Bretonneux (FR)

(73) Assignee: Eads Secure Networks, Elancourt (FR)

( * ) Notice: Subject to any disclaimer, the term of this patent is extended or adjusted under 35 U.S.C. 154(b) by 407 days.

(21) Appl. No.: 12/281,490

(22) PCT Filed: Feb. 27, 2007

(86) PCT No.: PCT/FR2007/050854
§ 371 (c)(1),
(2), (4) Date: Sep. 3, 2008

(87) PCT Pub. No.: WO2007/101956
PCT Pub. Date: Sep. 13, 2007

(65) Prior Publication Data
US 2009/0010284 A1 Jan. 8, 2009

(30) Foreign Application Priority Data
Mar. 6, 2006 (FR) ...................................... 06 01951

(51) Int. Cl.
*H04J 3/06* (2006.01)
(52) U.S. Cl. ........................................ 370/503; 370/509
(58) Field of Classification Search .................. 370/474, 370/503, 509, 512, 513, 514, 529
See application file for complete search history.

(56) References Cited

U.S. PATENT DOCUMENTS

| | | | |
|---|---|---|---|
| 6,044,085 A | 3/2000 | Horlander et al. | |
| 7,684,980 B2 | 3/2010 | Rousseau | |
| 2002/0066012 A1 | 5/2002 | Relander et al. | |
| 2002/0066013 A1 | 5/2002 | Relander et al. | |
| 2003/0037297 A1 | 2/2003 | Araki | |
| 2003/0091121 A1* | 5/2003 | Kenmochi | 375/272 |
| 2003/0210646 A1* | 11/2003 | Ohseki et al. | 370/203 |
| 2004/0165722 A1* | 8/2004 | Van Rijnsoever et al. | 380/43 |
| 2004/0213566 A1* | 10/2004 | Takanashi et al. | 398/32 |
| 2005/0013277 A1 | 1/2005 | Marque-Pucheu | |
| 2005/0281217 A1* | 12/2005 | Mottier | 370/328 |
| 2006/0093146 A1* | 5/2006 | Ungerboeck et al. | 380/268 |

(Continued)

FOREIGN PATENT DOCUMENTS
EP 1209844 5/2002
(Continued)

OTHER PUBLICATIONS

Final Draft ETSI EN 302 109 V1.1.1 (Jun. 2003): "Terrestrial Trunked Radio (TETRA); Security; Synchronization mechanism for end-to-end encryption" Jun. 2003, p. 1-17, XP002402074.

(Continued)

*Primary Examiner* — Andrew Lee
(74) *Attorney, Agent, or Firm* — Lowe Hauptman Ham & Berner LLP

(57) ABSTRACT

The invention relates to synchronization applied to a data stream structured as super-frames. Each block in a super-frame comprises a slow synchronization part and at least one traffic frame. The slow synchronization parts in the super-frame result at least from a decomposition of a synchronization management word. Additional synchronization parts similar to the slow synchronization parts and distributed in place of traffic frame bits in the super-frame are inserted in the super-frame. The invention provides for fast synchronization coexisting with a pre-existing slow synchronization without increasing the bandwidth. The invention is particularly applicable to cryptographic synchronization between fixed and/or mobile terminal equipments operating in interconnected dissimilar networks whose synchronization time constants differ.

17 Claims, 4 Drawing Sheets

U.S. PATENT DOCUMENTS

2006/0126492 A1* 6/2006 Hyun et al. .................. 370/208
2007/0291777 A1* 12/2007 Jamieson et al. ............. 370/401
2008/0043753 A1* 2/2008 Shimanuki et al. ...... 370/395.62

FOREIGN PATENT DOCUMENTS

| WO | 2004014019 | 2/2004 |
| WO | 2005024786 | 3/2005 |

OTHER PUBLICATIONS

Dworkin, M., Recommndation for Block Cipher Modes of Operation, Methods and Techniques, NIST Publication 800-38A, 2001 Edition, National Institute of Standards and Technology, Technology Administration, US Department of Commerce, Dec. 2001.

* cited by examiner

INTERLEAVED CRYPTOGRAPHIC SYNCHRONIZATION

RELATED APPLICATIONS

The present application is based on, and claims priority from, FR Application Number 0601951, filed Mar. 6, 2006, and PCT Application Number PCT/FR07/050854, filed Feb. 27, 2007, the disclosures of which are hereby incorporated by reference herein in their entireties.

FIELD OF THE INVENTION

The present invention relates to synchronization applied to a data stream structured as super-frames each formed of blocks of frames, particularly within a data cryptography context so as to synchronize senders and receivers in equipments that transmit between themselves a stream of data that is encrypted in real time.

It finds applications in particular in the field of secure telecommunications.

BACKGROUND OF THE INVENTION

First of all the following terms are defined:

frame: a binary sequence, for example arising from an iteration of a cryptographic module, of length $S_{frame}$ ($S_{frame} > 1$ bit);

block: a group of n consecutive frames, with $n \geq 1$;

super-frame: a group formed of p consecutive blocks, with $p \geq 1$;

encrypted data stream: a succession of super-frames.

The terms frame, block and super-frame defined above within the context of an application stream between remote terminal equipments do not prejudge the underlying structuring of the streams by the transmission bearer service: a super-frame, or a block or a frame, sent by an application may for example correspond to an unsegmented packet transmitted in the transport layer.

A difficulty created by the implementation of secure communications is that receivers in the equipment must be synchronized or resynchronized sufficiently rapidly with an encrypted data stream. The specifications of the known cryptographic suites consider only a single assumption about the frequency of the cryptographic synchronizations, dimensioned around time constants associated with a given underlying network. This is problematic for an end-to-end encrypted data stream whose terminal equipments operate in dissimilar networks. For example, for a point-to-point communication or for a teleconference, the terminal communication equipments may be diverse: a first terminal equipment may be bound to a wired network, a second terminal equipment may be situated in a cell of a cellular radiocommunication network for mobiles, a third terminal equipment is a satellite communication terminal, and a fourth terminal equipment is an HF radio apparatus operating with frequency shifts.

Transmission of an encrypted data stream between fixed terminal equipments of a wired network whose communication service is reliable requires essentially only slow cryptographic synchronization.

Transmission of an encrypted data stream via a network, certain segments of which cater for non-reliable transmissions, for example radio transmissions, may lead certain receivers not to receive the entire cryptographic synchronization information necessary for processing the encrypted data stream or may lead certain receivers to lose the necessary synchronism between the decryption and the reception of frames of the encrypted data stream. A method of fast resynchronization is then necessary.

Fast synchronization is also necessary when a terminal equipment of the communication requires an intercell transfer (or "handover") or an announced cell reselection, that is to say when the encrypted data stream changes transmission channel, thereby temporarily interrupting reception and causing the terminal equipment to lose cryptographic synchronism.

Fast synchronization is also necessary when a terminal equipment wishing to participate in an encrypted communication already begun between other terminal equipments requires late entry into the communication.

Furthermore, fast synchronization is useful when the encrypted data stream received continuously by a receiver for a given communication has undergone upstream a pre-emption of a sender by a sender of higher priority.

The measurement of the speed of cryptographic synchronization and the limitations of the prior art are presented hereinafter.

There exist various modes of cryptographic synchronization, some of which require the explicit transmission of parameters of a cryptographic state word so as to initialize the decryption process. Some of these modes, such as the OFB (Output FeedBack mode) and CTR (CounTeR mode) modes, are for example described in the American publication from the National Institute of Standards and Technology "NIST Special Publication 800-38A 2001 Edition, Recommendation for Block Cipher Modes of Operation—Methods and Techniques". The transmitted parameters of the cryptographic state word define a synchronization management word SY.

In the prior art, the synchronization management word is typically transmitted in association with each super-frame of an encrypted data stream.

Two known association procedures are recalled below.

In the first association procedure, the bandwidth $B_{SY}$ necessary for transmitting the frame containing the synchronization management word is sampled by frame stealing from the bandwidth $B_T$ Of the stream of encrypted traffic frames. The necessary total bandwidth, expressed in bit/s, is then $B=B_T$. The first association procedure by frame stealing is described in the standard ETSI EN 302 109 V1.1.1, "Terrestrial Trunked Radio (TETRA); Security; Synchronization mechanism for end-to-end encryption" June 2003, pages 1-17.

In the second association procedure, the bandwidth $B_{SY}$ necessary for transmitting the synchronization management word can be complementary to the bandwidth $B_T$ necessary for transmitting the stream of encrypted traffic frames. Two logical channels are then defined: a traffic channel for the encrypted frames and a signaling channel associated with the traffic channel for the frames containing the synchronization management word. The necessary total bandwidth is then $B=B_{SY}+B_T$. The second procedure is described in international patent application WO 2004/014019.

Let $S_{SY}$ be the size of the synchronization word SY expressed in bits, determined consistently with the choice of the encryption flow chart, of the mode of synchronization and of a crypto-period. This size does not depend directly on the structuring of the stream into frames, blocks and super-frames.

According to a first assumption, the synchronization management word has a size $S_{SY}$ less than or equal to the size of a traffic frame.

The stream actually transmitted according to the first association procedure consists of a series of super-frames of dimension 1. Each of these super-frames is formed of a single block (p=1) comprising a synchronization frame containing the synchronization management word of the super-frame and n−1 frames of encrypted traffic data. The first traffic frame is stolen and replaced with the synchronization frame and is therefore not transmitted.

The stream actually transmitted according to the second association procedure consists of a series of super-frames of dimension 2. Each of these super-frames is formed of a single block (p=1) comprising for example in the signaling channel a synchronization frame containing the synchronization management word of the super-frame and in the associated traffic channel n frames of encrypted traffic data.

According to a second assumption, the synchronization management word of the super-frame has a size $S_{SY}$ greater than or equal to the size $S_{frame}$ of a frame. Without restricting the generality of this assumption, the synchronization management word must be transmitted in identifiable frames separable from the traffic frames of the encrypted data stream, the converse case being overcome by segmenting the frames of the encrypted data stream into as many ad-hoc frames. According to a simple example, it is assumed that $S_{SY}=P \times S_{frame}$ and the synchronization management word results from the concatenation of p synchronization frames for a given super-frame.

The stream actually transmitted according to the first association procedure then consists of a series of super-frames. Each of these super-frames is formed of p blocks of dimension 1 each comprising a respective synchronization frame followed by n−1 traffic frames, the synchronization frames respectively in the p blocks of the super-frame and concatenated in the order in which they are sent constituting the synchronization management word replacing p traffic frames.

The stream actually transmitted according to the second association procedure still consists of a series of super-frames. Each of these super-frames is formed of a single block (p=1) of dimension 2 which comprises in the signaling channel the synchronization management word followed in the traffic channel by n traffic frames.

Thus, according to the prior art, whatever the assumption regarding the size $S_{SY}$ of the synchronization management word and the first or the second association procedure, cryptographic synchronization is possible approximately after each occurrence of a super-frame, once the synchronization management word is known. This leads approximately to an inter-synchronization period equal to $T_{sync}=(n\ p\ S_{frame})/B$.

The measurement of the speed $T_{sync}$ of cryptographic synchronization for a real example highlights the limitations of the prior art: with B=2400 bit/s, $S_{frame}$=54 bits, n=24, p=3, we obtain $T_{sync}$=1.62 s; with B=2400 bit/s, $S_{frame}$=54 bits, n=24, p=4, we obtain $T_{sync}$=2.16 s.

These values of inter-synchronization period $T_{sync}$ are satisfactory for a point-to-point communication in a telephone network with slow call setup, of the order of a few seconds. They are nevertheless incompatible with fast synchronization time constants, typically of the order of 0.3 to 1 second at the maximum, necessary in radiocommunication networks for mobiles implementing functions for intercell transfer, late entry or pre-emption. They are furthermore much greater than the typical duration of a phoneme in a speech signal which is encrypted into the encrypted data stream. These values of inter-synchronization period $T_{sync}$ are thus incompatible with the needs of interoperable secure communications simultaneously involving user terminal equipment through dissimilar networks. The requirement for fast synchronization can be illustrated by a multi-user secure teleconference involving equipments such as a user terminal of an ISDN or IP wired network, a mobile terminal of a GSM or UMTS cellular radiocommunication network and/or a mobile terminal of a PMR professional mobile radiocommunication network.

A synchronization method is moreover known, described in European patent application 1209844, which adds extra synchronization frames in the encrypted data stream. The addition of these extra synchronization frames modifies the bandwidth initially necessary for the encrypted data stream and does not satisfy a requirement for fast synchronization in an optimized manner. Furthermore, this synchronization method destroys the synchronism of the encrypted data stream and therefore the prior slow synchronization, thereby requiring that all the receivers process the extra synchronization frames and thus constituting an interoperability limitation on security. Consequently, this method is inappropriate for ensuring a fast synchronization coexisting with a pre-existing slow synchronization, from which it profits.

SUMMARY OF THE INVENTION

An object of the invention is to overcome the previous drawbacks of the prior art, by synchronization of an equipment with a data stream in real time which allows a fast synchronization coexisting with a slow synchronization, without increasing the initial bandwidth necessary for the data stream.

To achieve this object, a synchronization method applied to a data stream structured into super-frames each formed of blocks of frames, each block in a super-frame comprising a slow synchronization part and at least one traffic frame, the slow synchronization parts in the super-frame resulting at least from a decomposition of a synchronization management word, is characterized in the super-frame by an insertion of additional synchronization parts similar to the slow synchronization parts and distributed in place of traffic frame bits in the super-frame.

The synchronization management word is preserved without change of order or decomposition of the slow synchronization parts. For example the grouping of the slow synchronization parts according to a predetermined order, such as for example a concatenation, aids reproduction of the synchronization management word. According to the invention, the conservation of the slow synchronization parts allows any current equipment to continue to operate with the slow synchronization, without any modification in the current equipment. The slow synchronization parts arising from the synchronization management word are introduced into the super-frame according to one or the other of the first and second known association procedures. The additional synchronization parts are similar to the slow synchronization parts, that is to say the additional synchronization parts are respectively identical to or a little different from the slow synchronization parts, and are added according to the invention to a super-frame by replacing traffic frame bits and therefore by stealing certain whole traffic frames and/or by stealing certain bits of traffic frames.

The additional synchronization parts afford a equipment the possibility of operating with a faster synchronization than the slow synchronization, when this turns out to be useful, such as for example during a cell handover for a mobile terminal or a base station in a cellular radiocommunication network. The fast synchronization coexists with the pre-existing slow synchronization without leading to any modifications of current equipments operating only with the slow synchronization.

The invention is particularly beneficial for cryptographic synchronization of equipment to a data stream encrypted in real time, structured into super-frames, in which the encryption depends also on the synchronization management word and the initial slicing of each super-frame into blocks of identical size and each including a respective slow synchronization part and one or more traffic frames.

Let k=Ceiling (p/2) be an integer number for a number p of blocks in the super-frame. The operator Ceiling is equal to the argument p/2 if it is an integer and is equal to the integer immediately greater than the argument otherwise. For example, we have k=2 for p=3 and k=2 for p=4. The duration between two successive fast synchronizations according to the method of the invention can be substantially at most $T'_{sync}=(n\ k\ S_{frame})/B$, and therefore less than the period $T_{sync}=(n\ p\ S_{frame})/B$ for the slow synchronization according to the prior art.

The method of the invention allows a fast synchronization substantially in at most k=2 blocks for a super-frame formed of 3 blocks or of 4 blocks, while preserving the slow synchronization in the super-frame. Stated otherwise, the method of the invention allows a fast synchronization in fewer than k n=2 n frames, and a slow synchronization in fewer than 3 n frames for a super-frame formed of 3 n frames or in fewer than 4 n frames for a super-frame formed of 4 n frames, n being the number of frames per block.

According to an embodiment of the invention, one of the additional synchronization parts replaces a traffic frame in a block of the super-frame. In particular, the additional synchronization parts can respectively replace traffic frames in the blocks of the super-frame, at a rate of one traffic frame per block, the slow synchronization parts and the additional synchronization parts then being interleaved. In a receiver receiving the data stream structured into super-frames, the synchronization management word is reconstituted by observing consecutive blocks of the super-frame received in number strictly less than the number of blocks in the super-frame; the number of observed consecutive blocks can be further reduced until it is substantially less than half the number of blocks in the super-frame.

If the slow synchronization parts are introduced into the super-frame following the first association procedure, the number of traffic frames stolen from the super-frame goes from p to 2p, this corresponding to a rate of erasure of traffic frames of the data stream that is twice that of the prior art. If the slow synchronization parts are introduced into the super-frame following the second association procedure, the number of traffic frames stolen from the super-frame goes from 0 to p, this corresponding to a rate of erasure of frames of the data stream equal to 1/n, instead of 0 according to the prior art.

According to other embodiments of the invention, one of the additional synchronization parts replaces predetermined bits in predetermined traffic frames in a block of the super-frame, that is to say these traffic frames are altered only partially by the additional synchronization part. The additional synchronization parts can have sub-parts which have a size in bits less than the size of the traffic frames and which are distributed in replacement for predetermined bits in all the traffic frames in the super-frame, or certain traffic frames having predetermined ranks in a predetermined block or predetermined blocks of the super-frame.

In comparison with the slow synchronization dependent on the synchronization management word and systematically present in each super-frame of the structured data stream, another advantage of the method of the invention is that the additional synchronization parts on which the fast synchronization also dependent on the slow synchronization parts depends, can be transmitted optionally in each super-frame, as a function of the requirements of the equipments.

The invention also relates to a synchronization sequence in a super-frame of a data stream structured into super-frames each formed of blocks of digital frames, each block in a super-frame comprising a slow synchronization part and at least one traffic frame, the slow synchronization parts in the super-frame resulting at least from a decomposition of a synchronization management word. The synchronization sequence is characterized in that it comprises additional synchronization parts similar to the slow synchronization parts and distributed in place of traffic bits in the super-frame.

The invention further relates to a sender and a receiver for example in a fixed and/or mobile terminal equipment or in a gateway equipment between two telecommunication networks that are dissimilar in regard to synchronization.

The sender is able to send a data stream structured into super-frames each formed of blocks of frames, each block in a super-frame comprising a slow synchronization part and at least one traffic frame, the slow synchronization parts in the super-frame resulting at least from a decomposition of a synchronization management word. The sender is characterized in that it comprises means for inserting additional synchronization parts into the super-frame that are similar to the slow synchronization parts and distributed in place of traffic frame bits in the super-frame.

The receiver is able to receive a data stream structured into super-frames each formed of blocks of frames, each block in a super-frame comprising a slow synchronization part and at least one traffic frame, the slow synchronization parts in the super-frame resulting at least from a decomposition of a synchronization management word. The receiver is characterized in that it comprises means for reconstituting the synchronization management word by observing consecutive blocks in a received super-frame in which additional synchronization parts are similar to the slow synchronization parts and distributed in place of traffic frame bits in the super-frame.

BRIEF DESCRIPTION OF THE DRAWING

Other features and advantages of the present invention will become more clearly apparent on reading the following description of several embodiments of the invention, given by way of nonlimiting examples, with reference to the corresponding accompanying drawings in which.

DETAILED DESCRIPTION OF THE DRAWING

Figure 1:
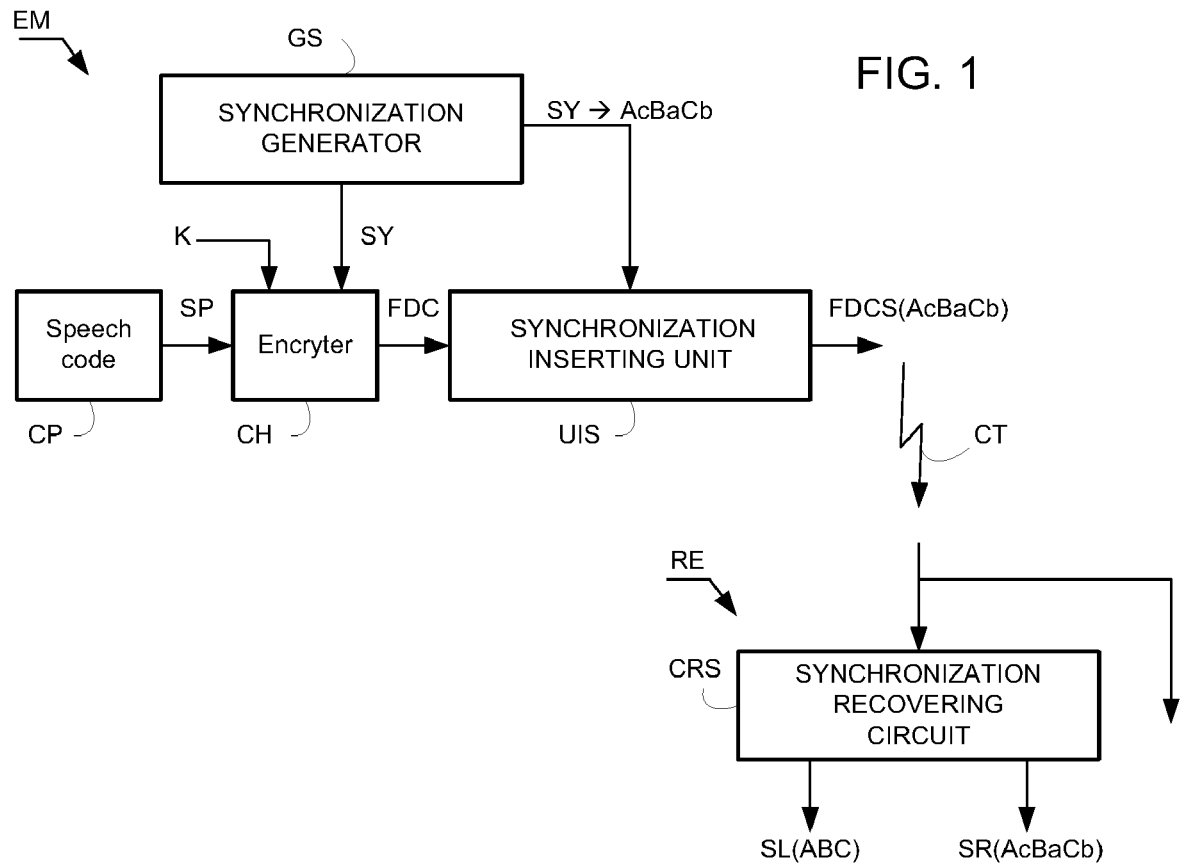
FIG. 1 is a schematic block diagram of a sender of a terminal equipment and of a receiver RE of another terminal equipment for the implementation of the cryptographic synchronization method of the invention.

With reference to FIG. 1, an equipment implementing the method according to the invention is for example a mobile terminal or a base station of a terrestrial or aeronautical or satellite cellular radiocommunication network, or else of TETRA professional terrestrial radio type, or else indeed a fixed terminal such as a digital telephone installation or set, a computer or a local network served by a digital network of ISDN or IP type.

In a sender EM of the terminal equipment, a plain text data stream, for example a digital speech signal SP produced by a speech coder CP, is encrypted into a digital encrypted data stream FDC in an encrypter CH. The encryption of the speech signal is periodic at a traffic frame frequency and is a function of cryptographic sequences dependent on a synchronization management word SY and a secret cipher key K associated with the terminal equipment.

The synchronization management word SY is generated and maintained by a synchronization generator GS which produces slow synchronization parts and additional synchronization parts resulting at least from a decomposition of the synchronization management word SY so as to apply them as a cryptographic synchronization sequence according to the invention at a super-frame frequency to a synchronization inserting unit UIS. The unit UIS produces a synchronized encrypted data stream FDCS which is thereafter modulated so as to be transmitted via a transmission channel CT to the receiver RE of another terminal equipment. The digital data stream FDCS is structured into super-frames ST, one or in general several of which each contain a cryptographic synchronization sequence which serves at one and the same time for the synchronism with the receivers of terminal equipments requiring only a pre-existing slow synchronization SL in a known manner dependent on the synchronization management word SY and for the synchronism with the receivers of terminal equipments requiring in particular a fast synchronization SR dependent on the slow synchronization parts and the additional synchronization parts. In FIG. 1, it has been assumed that the receiver RE comprises a synchronization recovering circuit CRS that sometimes recovers the slow synchronization SL, and sometimes the fast synchronization SR, although synchronization recovery circuits in receivers of other terminal equipments that are able to communicate with the sender EM are designed only to recover the slow synchronization SL or the fast synchronization SR.

In the unit UIS, the transmission of slow synchronization parts in the encrypted data stream FDC is carried out in a known manner, "on the fly", at the block period in a super-frame, either according to the first association procedure by stealing traffic frames and thus periodically replacing traffic frames by slow synchronization parts of the same size, or according to the second association procedure by periodically introducing the slow synchronization parts of the same size into a logical channel, for example a signaling channel, associated with some other logical channel, such as a traffic channel, transporting the traffic frames of the encrypted data stream FDC.

The insertion of the additional synchronization parts into the encrypted data stream FDC is according to the invention carried out by stealing traffic frames, or else by stealing traffic frame bits, i.e. by replacing traffic frames or else traffic frame bits with additional synchronization parts in each super-frame in the encrypted data stream FDC.

Two examples of super-frame structure ST will be referred to subsequently in the description.

According to a first example shown in FIGS. 3, 4, 7, 8, 11, 12 and 13 a super-frame is composed of p=3 blocks and each block comprises n=24 frames numbered $T_1$ to $T_{24}$ in the first block and $T_{25}$ to $T_{48}$ in the second block and $T_{49}$ to $T_{72}$ in the third block. The synchronization management word SY has a size of p $S_{frame}$=3 $S_{frame}$, where $S_{frame}$ is the size of a frame. P=3 slow synchronization parts A, B and C (rightward hatched rectangles) that are a priori mutually different and of identical size to that of a traffic frame result entirely or at least mainly from a decomposition of the synchronization management word SY.

According to a second example shown in FIGS. 5, 6, 9 and 10, a super-frame is composed of p=4 blocks and each block comprises n=24 frames numbered $T_1$ to $T_{24}$ in the first block, $T_{25}$ to $T_{48}$ in the second block, $T_{49}$ to $T_{72}$ in the third block and $T_{73}$ to $T_{96}$ in the fourth block. The synchronization management word SY has a size of 4 $S_{frame}$ P=4 slow synchronization parts A, B, C and D (rightward hatched rectangles) that are a priori mutually different and of identical size to that of a traffic frame result entirely or at least mainly from a decomposition of the synchronization management word SY.

The parts A, B and C or A, B, C and D provided by the generator GS may simply be consecutive parts of the synchronization management word SY whose concatenation reconstructs the word SY, or else these consecutive parts but according to a different order from that in the word SY. According to other variants, each of the parts A, B and C, or A, B, C and D is composed of several series of bits of identical or different sizes that are less than the size of a frame, sampled according to an order that is predetermined in the synchronization management word SY; for example the parts A, B and C are respectively composed of least significant bits, of most and least significant bits and of most significant bits of the word SY. The parts A, B and C or A, B, C and D can comprise a small proportion of elements, for example redundancy elements, or prefixes or suffixes, which do not belong to the synchronization management word SY. The parts A, B and C or A, B, C and D thus result at least from a predetermined decomposition of the synchronization management word and are thus derived from a predetermined function applied to the synchronization management word SY. Stated otherwise, each of the parts A, B and C or A, B, C and D can comprise, but not exclusively, one or more respective consecutive or non-consecutive portions of the word SY, and the union of all these portions in the parts A, B and C or A, B, C and D lies in the word SY.

Figure 2:
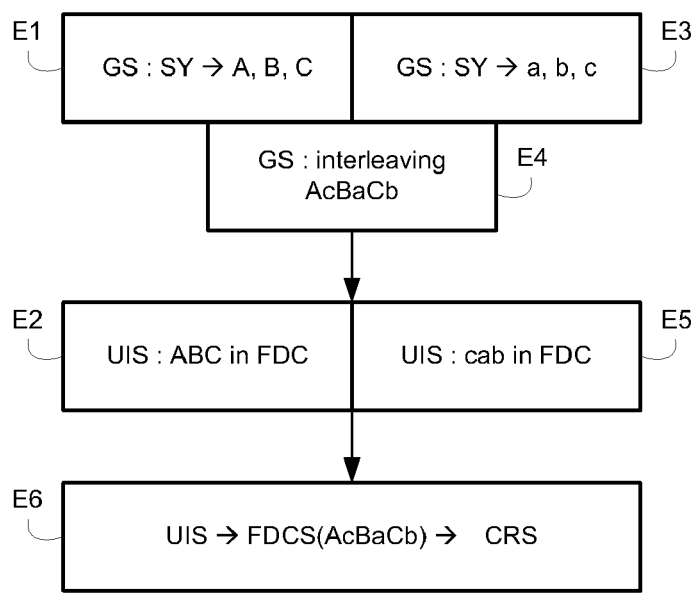
FIG. 2 is a flow chart of steps of the cryptographic synchronization method.
Figure 3:
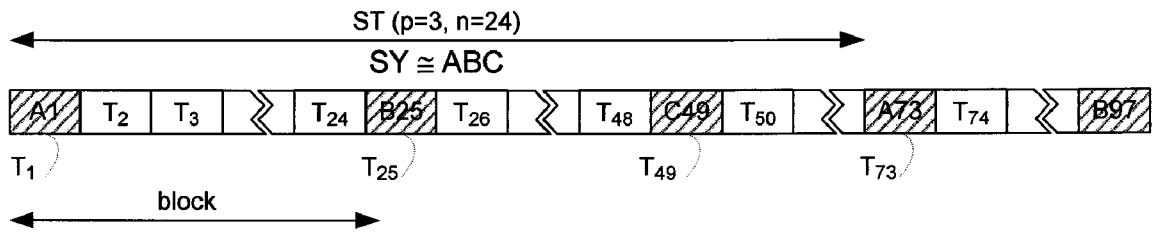
FIGS. 3 and 5 show the structure of super-frames in an encrypted data stream with a slow synchronization according to the first association procedure respectively for first and second examples according to the prior art.

A first embodiment of the synchronization method of the invention relates to the first association procedure as regards the insertion of the slow synchronization parts. The method comprises steps E1 to E6 shown in FIG. 2.

With reference to the first example of a super-frame ST, the synchronization generator GS produces on the basis of the synchronization management word SY the p=3 slow synchronization parts A, B and C of identical size and applies them to the unit UIS so as to insert them into the encrypted data stream FDC according to the first association procedure, in step E1. The synchronization inserting unit UIS periodically steals p=3 frames from the stream FDC by replacing three traffic frames $T_1$, $T_{25}$ and $T_{49}$ respectively with the slow synchronization parts A, B and C in step E2. The parts A, B and C in the stream FDCS are denoted A1, B25 and C49 in the super-frame shown in FIG. 3. By convention, the start of the super-frame of dimension 1 in the synchronized encrypted data stream FDCS can be defined by the first part A1 dependent on the start of the word SY. The parts A1, B25 and C49 constituting the cryptographic synchronization information cue are thus transmitted in the total bandwidth necessary for transmitting the encrypted data stream FDC. The replaced traffic frames $T_1$, $T_{25}$ and $T_{49}$ are thus not transmitted.

The synchronization inserting unit UIS can comprise functionalities analogous for example to those of the parametric vocoder described in international patent application WO 2005/024786 (PCT/FR2004/02259) and serving to insert a secondary information stream, in the guise of cryptographic synchronization information stream ABC, into a main information stream, in the guise of encrypted data stream FDC, having a higher bit rate. This assumes that the frames of the encrypted data stream FDC are frames encrypted according to an OFB or CTR mode mentioned above or a mode with similar properties to the CTR mode. A generator of frame masks in the vocoder selects, from among the p×n traffic frames in each super-frame of the encrypted data stream FDC, those $T_1$, $T_{25}$ and $T_{49}$ into which only the slow synchronization parts A1, B25 and C49 have to be inserted.

Steps E1 and E2 are carried out in a known manner.

According to the invention, the synchronization generator GS generates and also maintains additional synchronization parts at the super-frame frequency, in step E3 which can be simultaneous with step E1. The generator GS produces on the basis of the synchronization management word p=3 additional synchronization parts a, b and c respectively similar to the slow synchronization parts A, B and C and of identical size to that of a traffic frame. The term "similar" means that the additional synchronization parts a, b and c can be identical respectively to the slow synchronization parts A, B and C, or else can be in a low proportion different respectively from the parts A, B and C. In the latter variant, the parts a, b and c comprise for example prefixes or suffixes which are respectively different from those of the parts A, B and C. The notable differences between the parts of the pairs (A, a), (B, b) and (C, c) do not contravene, in the receiver, the reconstitution of the original word SY on the basis of a sequence of the type AcB, cBa, BaC, aCb, CbA or bAc, as will be seen subsequently in the description.

Finally in step E4 intermediate between steps E1-E3 and E2-E5, the generator GS interleaves the slow synchronization parts A, B and C with the additional synchronization parts a, b and c so as to constitute a cryptographic synchronization sequence AcBaCb.

The sequence cab (cross-hatched rectangles) derived from the synchronization management word SY is applied while being interleaved with the parts A, B and C to the unit UIS so as also to be inserted into the encrypted data stream FDC, in step E5. In practice, steps E2 and E5 are interleaved in accordance with the interleaving of the sequences ABC and cab. The synchronization inserting unit UIS periodically steals p=3 frames from the stream FDC by replacing three traffic frames $T_{12}$, $T_{36}$ and $T_{60}$ respectively with the parts c, a and b which are denoted C12, A36 and B60 in the super-frame shown in FIG. 4. The cryptographic synchronization sequence AcBaCb is thus transmitted in the total bandwidth necessary for transmitting the encrypted data stream FDC, in step E6. The replaced traffic frames $T_1$, $T_{12}$, $T_{25}$, $T_{36}$, $T_{49}$ and $T_{60}$ are not transmitted.

In the super-frame of dimension 1 of the synchronized encrypted data stream FDCS, the interleaving of the parts A, B and C with the parts c, a and b into the cryptographic synchronization sequence AcBaCb is such that an additional synchronization part c substantially dependent on the end of the synchronization management word SY is inserted into the super-frame after another slow synchronization part A dependent on the start of the synchronization management word. Stated otherwise, most significant bits of the synchronization management word SY precede least significant bits of the synchronization management word SY so that in the receiver RE the knowledge of a slow synchronization part SY and of two additional synchronization parts, or the knowledge of two additional synchronization parts and of a slow synchronization part, serve to reconstruct the synchronization management word SY≅ABC≅abc in full. This characteristic is useful to the synchronization recovering circuit CRS in the receiver RE of another terminal equipment requiring a fast synchronization SR so as still to retrieve the synchronization management word in three consecutive parts of the cryptographic synchronization sequence received, i.e. AcB, cBa, BaC, aCb, CbA and bAc. The detection of a sequence AcB, cBa, BaC, aCb, CbA, bAc results from the observation of at most 2 consecutive blocks of the super-frame ST. These consecutive blocks of the super-frame are therefore strictly fewer in number than the number 3 of blocks in the super-frame and help to reconstitute the same information as the sequence ABC in the receiver RE.

The order of insertion of the additional synchronization parts c, a and b maximizes the speed of reconstitution of the synchronization management word SY. In the receiver, the recognition of the parts c, a and b may be similar but different from the recognition of the parts of the sequence ABC: for example, the use of various pseudo-random prefixes that are determined at the start of the parts A, B, C, a, b and c is appropriate; the use of prefixes that are not all identical is also appropriate.

Figure 4:
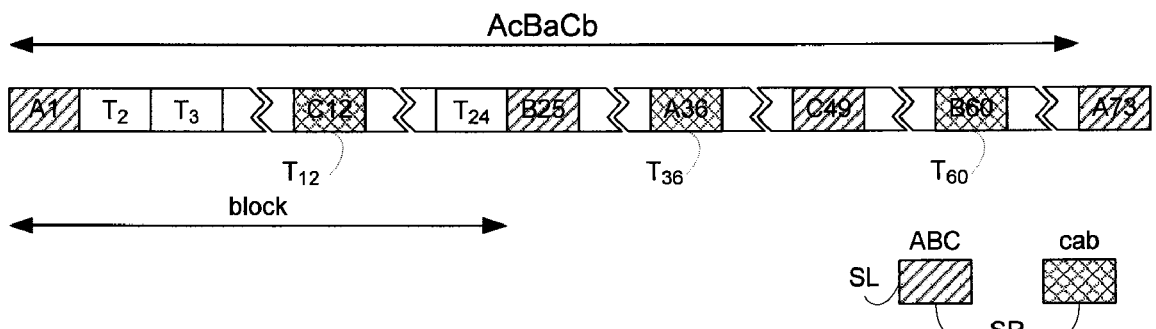
FIGS. 4 and 6 show the structure of super-frames in an encrypted data stream with a slow synchronization respectively according to FIGS. 3 and 5 and supplemented according to a first embodiment of the invention.

Although each additional synchronization part c, a or b can replace any traffic frame included in the first, second or third block in the super-frame, it is preferable for the traffic frames T.sub.12, T.sub.36 and T.sub.60 replaced with the additional synchronization parts c, a and b to be temporally situated substantially in the middle respectively of the blocks of the super-frame, as apparent in FIG. 4. These temporal positions of the parts c, a and b substantially central to the blocks minimizes on average the fast synchronization recovery period. Specifically, in the worst case, when the fast synchronization is triggered in the receiver RE just after having detected any one of the synchronization frames A1, C12, B25, A36, C49 and B60 which in combination ensure the pre-existing slow synchronization according to the prior art and the fast synchronization according to the invention, the synchronization recovering circuit CRS in the receiver observes at most half of the super-frame ST, i.e. at most the frames during 1.5 block periods according to this first example of a super-frame, so as to recover one of the sequences AcB, cBa, BaC, aCb, CbA, bAc and reconstitute the same information as the synchronization management word SY≅ABC.

Figure 6:
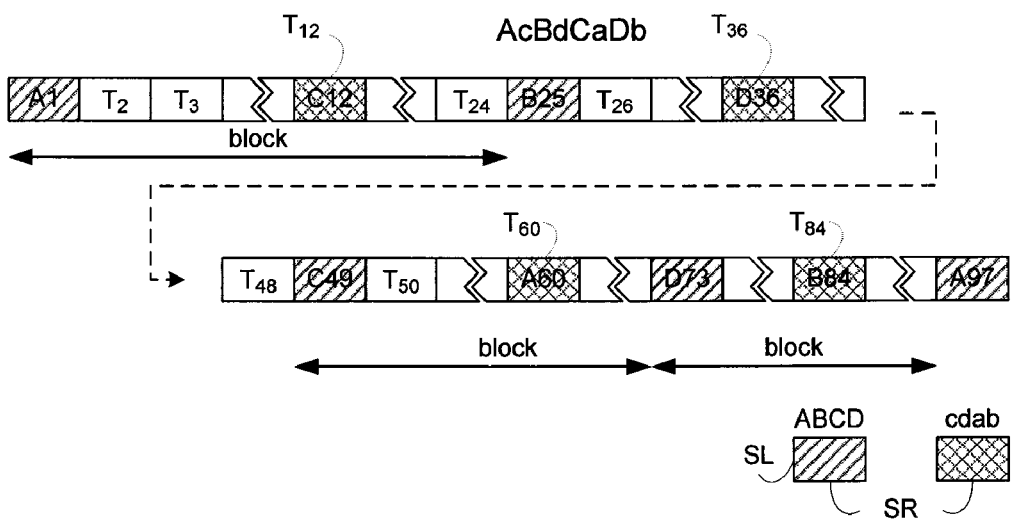

By way of illustration, for a bit rate B=2400 bit/s of the streams FDC and FDCS and parameters $S_{frame}$=54 bits, n=24, p=3 and therefore k=2, the fast synchronization period is $T'_{sync}=(n1.5\ S_{frame})/B=0.81$ s for a temporal positioning of the additional synchronization parts c, a and b that is substantially central to the blocks of the super-frame, as shown in FIG. 6. At worst, if two additional synchronization parts, for example c and a, are inserted at opposite ends into consecutive blocks of the super-frame, in replacement for the traffic frame $T_2$ following the slow synchronization frame A1 and in replacement for the traffic frame $T_{48}$ preceding the slow synchronization frame C49, the fast synchronization period is at most spread over about two blocks, i.e. fewer than 2n frames, i.e. $T'_{sync} < (2 n S_{frame})/B = 1.08$ s. In all cases, the fast synchronization period is markedly less than the slow synchronization period of the synchronization management word SY≅ABC spread over at most 3n frames, i.e. $T_{sync} = (3 n S_{frame})/B = 1.62$ s.

The second example of a super-frame ST for the first embodiment of the synchronization method of the invention is now referred to.

The synchronization generator GS produces on the basis of the synchronization management word SY at the super-frame frequency, p=4 slow synchronization parts A, B, C and D and p=4 additional synchronization parts a, b, c and d of identical size, in steps E1 and E3. The additional synchronization parts a, b, c and d are respectively similar to the slow synchronization parts A, B, C and D. In step E4, the generator GS interleaves the slow synchronization parts A, B, C and D with the additional synchronization parts a, b, c and d so as to constitute a cryptographic synchronization sequence AcBdCaDb.

The sequence AcBdCaDb resulting from an interleaving of order 2 of the slow synchronization parts and of the additional synchronization parts is applied to the unit UIS which inserts it into the encrypted data stream FDC according to the first association procedure, in steps E2 and E5. The synchronization inserting unit UIS periodically steals 2p=8 frames from the stream FDC by replacing four traffic frames $T_1$, $T_{25}$, $T_{49}$ and $T_{73}$ respectively with the slow synchronization parts A, B, C and D which are denoted A1, B25, C49 and D73 in the super-frame shown in FIG. 6, and by replacing four traffic frames $T_{12}$, $T_{36}$, $T_{60}$ and $T_{84}$ respectively with the additional synchronization parts c, d, a and b which are denoted C12, D36, A60 and B84 (cross-hatched rectangles) in the super-frame shown in FIG. 6.

Figure 5:
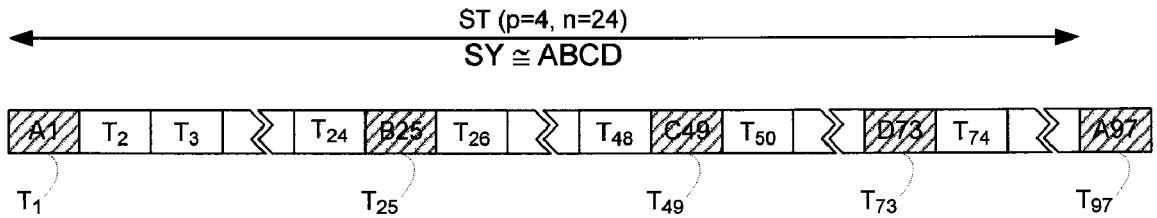

In comparison to the super-frame shown in FIG. 5 comprising only the synchronization management word SY=ABCD and relating to the slow synchronization SL according to the prior art, the invention adds the p=4 additional synchronization parts c, d, a and b. The cryptographic synchronization sequence AcBdCaDb is thus transmitted in the total bandwidth necessary for transmitting the encrypted data stream FDC, in step E6. The replaced traffic frames $T_1$, $T_{12}$, $T_{25}$, $T_{36}$, $T_{49}$, $T_{60}$, $T_{73}$ and $T_{84}$ are not transmitted.

The cryptographic synchronization sequence AcBdCaDb exhibits characteristics analogous to the sequence AcBaCb. The synchronization recovering circuit CRS in the receiver RE of another terminal equipment requiring a fast synchronization SR still retrieves the synchronization management word SY≅ABCD in at most five consecutive parts of the cryptographic synchronization sequence received, i.e. AcBd, cBdCa, BdCa, dCaDb, CaDb, aDbAc, DbAc, bAcBd, while preserving the slow synchronization sequence ABCD. The detection of a sequence AcBd, cBdCa, BdCa, dCaDb, CaDb, aDbAc, DbAc, bAcBd makes it possible to reconstitute the same synchronization information as the sequence ABCD in the receiver RE.

The temporal positions of the additional synchronization parts c, d, a and b are preferably substantially central to the blocks so as to maximize the speed of reconstitution of the synchronization word ABCD≅SY and minimize on average the fast synchronization recovery period in the synchronization recovering circuit CRS of the receiver.

Using the same bit rate and parameter values but with p=4, the fast synchronization period $T_{sync}$ is at most spread over two blocks, i.e. fewer than 2n frames:

$T_{sync^*} = (nkS_{frame})/B = (24 \times 2 \times 54)/2400 = 1.08$ s.

The fast synchronization period is still less than the slow synchronization period of the synchronization management word SY≅ABCD spread over 4n frames, i.e. $T_{sync} = (n 4 S_{frame})/B = 2.16$ s.

Other cryptographic synchronization sequences exhibit characteristics analogous to the previous sequences AcBaCb and AcBdCaDb. Thus in the order d, a, b and c, the additional synchronization parts are interleaved with the slow synchronization parts A, B, C and D to form the fast synchronization sequence AdBaCbDc in the encrypted data stream, while preserving the pre-existing slow synchronization sequence ABCD.

More generally, the number of slow synchronization parts and the number of additional synchronization parts may be greater than four, whatever the number n of frames per block.

A second embodiment of the synchronization method of the invention relates to the second association procedure as regards the insertion of the slow synchronization parts. The method comprises steps analogous to steps E1 to E6 shown in FIG. 2 and is described hereinafter also with reference to the first and second examples of a super-frame structure ST.

According to the prior art, the synchronization generator GS produces on the basis of the synchronization management word SY the p=3 slow synchronization parts A, B and C according to the first example, or the p=4 slow synchronization parts A, B, C and D according to the second example, in step E1. These slow synchronization parts are of identical sizes and applied to the synchronization inserting unit UIS. Instead of substantially degrading the audio by inserting the slow synchronization parts into the traffic channel according to the first association procedure and therefore by occupying resources that are useful to the communication, the unit UIS inserts the slow synchronization parts A, B and C, or A, B, C and D, into another logical channel associated with the traffic channel transporting the encrypted data stream FDC, according to the second association procedure.

For example according to international patent application WO 2004/014019, the traffic channel is composed of time intervals of a first TDMA ("Time Division Multiple Access") time division multiplexed type occupied by the traffic frames, as in the first embodiment, and the other logical channel is a signaling channel formed at least of a time interval of a second type occupied by the slow synchronization parts. A delay information representative of the time gap between a time interval of the second type and a traffic frame which is transmitted when a slow synchronization part is transmitted is also introduced into the signaling channel. The slow synchronization parts can be transmitted in the signaling channel when resources of the latter are available.

For example, when the sender EM is in a terminal equipment such as a mobile of a cellular network, the traffic channel is an uplink or downlink logical traffic channel TCH (for "Traffic CHannel") established on a predetermined frequency and multiplexed temporally with other logical channels: traffic channels allocated to other mobiles and at least one signaling channel. The signaling channel is a slow control channel of SACCH ("Slow Associated Control CHannel") type which transports the parts of the synchronization management word A, B and C, or A, B, C and D, and thus ensures a slow synchronization of the associated traffic channel, without altering the traffic channel by frame stealing. Thus in FIGS. 7 and 9, it is assumed by convention that the start of the super-frame of dimension 2, corresponding to a multiplexing of channels of order 2, in the synchronized encrypted data stream FDCS and therefore the start of the first block are defined by the first slow synchronization part A dependent on the start of the word SY and occupying a time interval A1 of the signaling channel preceding the first traffic frame $T_1$. At the start of the following blocks with n=24 traffic frames, the second part B occupies a time interval B25 of the signaling channel preceding the first traffic frame $T_{25}$ of the second block of the super-frame and the third part C occupies a time interval C49 of the signaling channel preceding the first traffic frame $T_{49}$ of the third block of the super-frame, and for the super-frame according to the second example (FIG. 9), the fourth part D occupies a time interval D73 of the signaling channel preceding the first traffic frame $T_{73}$ of the fourth block of the super-frame.

The parts A1, B25 and C49, or A1, B25, C49 and D73, representative of the cryptographic synchronization information cue is thus transmitted outside the bandwidth necessary for transmitting the encrypted data stream FDC which is not altered.

To associate the slow synchronization parts outside the band of the encrypted data stream, the synchronization inserting unit UIS can comprise functionalities analogous for example to those of the mobile terminal reception part according to international patent application WO 2004/014019, and in particular of the circuit processing the signal to be sent in this reception part.

According to the invention, the synchronization generator GS also generates on the basis of the synchronization management word SY at the super-frame frequency, in step E3, and maintains p=3 additional synchronization parts a, b and c respectively similar to the slow synchronization parts A, B and C, or p=4 additional synchronization parts a, b, c and d respectively similar to the slow synchronization parts A, B, C and D, and of identical size to that of a traffic frame. In step E4 intermediate between steps E1-E3 and E2-E5, the generator GS interleaves the slow synchronization parts A, B and C, or A, B, C and D, with the additional synchronization parts a, b and c, or a, b, c and d (cross-hatched rectangles), so as to constitute a cryptographic synchronization sequence AcBaCb according to FIG. 8, or AcBdCaDb according to FIG. 10.

The sequence cab, or cdab, derived from the synchronization management word SY and interleaved with the parts A, B and C, or A, B, C and D, is applied to the unit UIS so as to insert it into the encrypted data stream FDC by periodic traffic frame stealing in step E5, as in the first embodiment. To insert the additional synchronization parts a, b and c, or a, b, c and d into the band of the encrypted data stream, the synchronization inserting unit UIS can comprise functionalities analogous for example to those of the parametric vocoder including a traffic frames mask generator and described in international patent application WO 2005/024786 (PCT/FR2004/02259).

Figure 7:
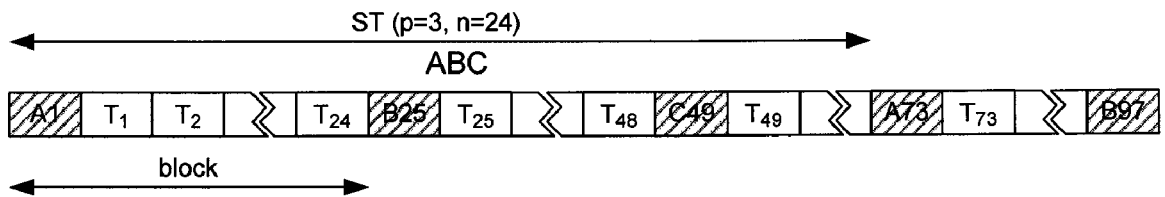
FIGS. 7 and 9 show the structure of super-frames in an encrypted data stream according to the second association procedure respectively for the first and second examples according to the prior art.

Thus what has been described for the first embodiment as regards the additional synchronization parts a, b and c, or a, b, c and d is valid for the second embodiment. As is apparent in FIG. 8 in accordance with FIG. 4 according to the first example, the three traffic frames $T_{12}$, $T_{36}$ and $T_{60}$ are replaced respectively with the parts c, a and b denoted C12, A36 and B60; these parts are temporally situated substantially in the middle respectively of the blocks of the super-frame and are interleaved with the parts A1, B25 and C49, the parts A1, B25 and C49 being distributed off-band in the super-frame as also shown in FIG. 7 of the prior art; the synchronization recovering circuit CRS in the receiver RE receiving the traffic channel and the signaling channel detects fast synchronization sequences AcB, cBa, BaC, aCb, CbA, bAc which each allow it to reconstitute the same information as the sequence ABC. According to the second example shown in FIG. 10 in accordance with FIG. 6, the four traffic frames $T_{12}$, $T_{36}$, $T_{60}$ and $T_{84}$ are replaced respectively with the parts c, d, a and b denoted C12, D36, A60 and B84; these parts are temporally situated substantially in the middle respectively of the blocks of the super-frame and are interleaved with the parts A1, B25, C49 and D73, the parts A1, B25, C49 and D73 being distributed off-band in the super-frame as also shown in FIG. 9 of the prior art; the synchronization recovering circuit CRS detects fast synchronization sequences AcBd, cBdCa, BdCa, dCaDb, CaDb, aDbAc, DbAc, bAcBd, which each allow it to reconstitute the same information as the sequence ABCD.

Figure 8:
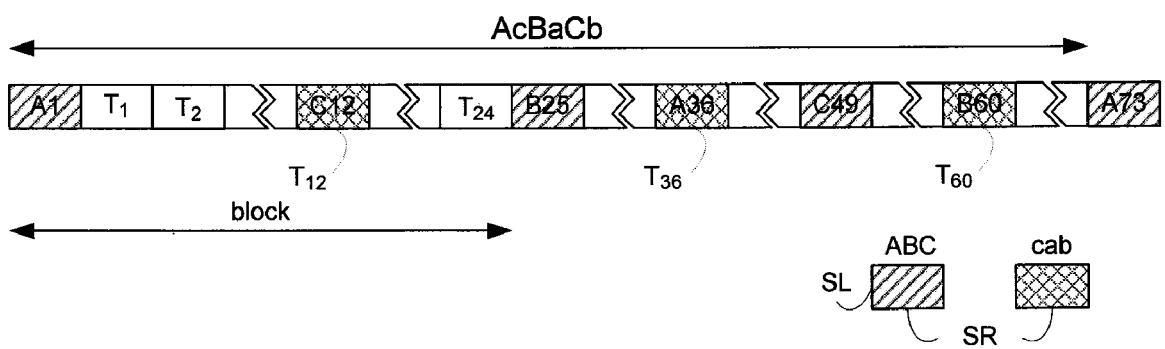
FIGS. 8 and 10 show the structure of super-frames in an encrypted data stream with a slow synchronization respectively according to FIGS. 7 and 9 and supplemented according to a second embodiment of the invention.
Figure 9:
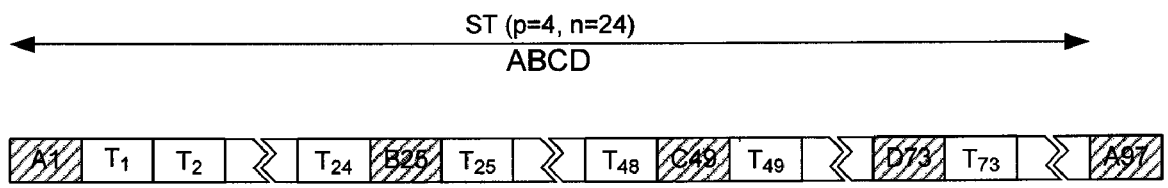
Figure 10:
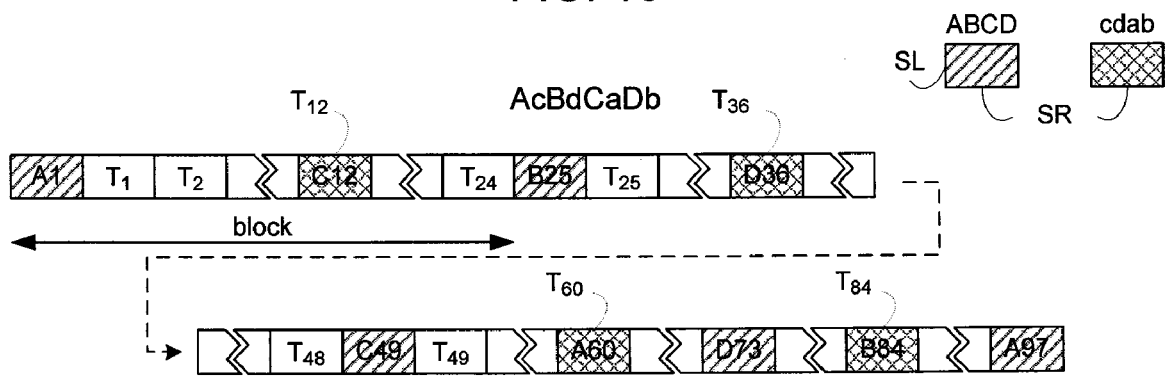

The fast synchronization is possible in at least 25 frames according to FIG. 8, as according to FIG. 4, and at worst in at most 47 frames if two additional synchronization parts, for example c and a, are inserted at opposite ends into consecutive blocks of the super-frame. In a similar manner, the fast synchronization is possible in at least 36 frames according to FIG. 10, as according to FIG. 6, and at worst in at most 72 frames.

The cryptographic synchronization sequence AcBaCb or AcBdCaDb still ensures the coexistence of the pre-existing slow synchronization SL and the fast synchronization SR.

The invention is not limited to the two embodiments described above, but embraces many other embodiments, a few of which are presented below. The number of parts making up a cryptographic synchronization sequence can be greater than eight.

Figure 11:
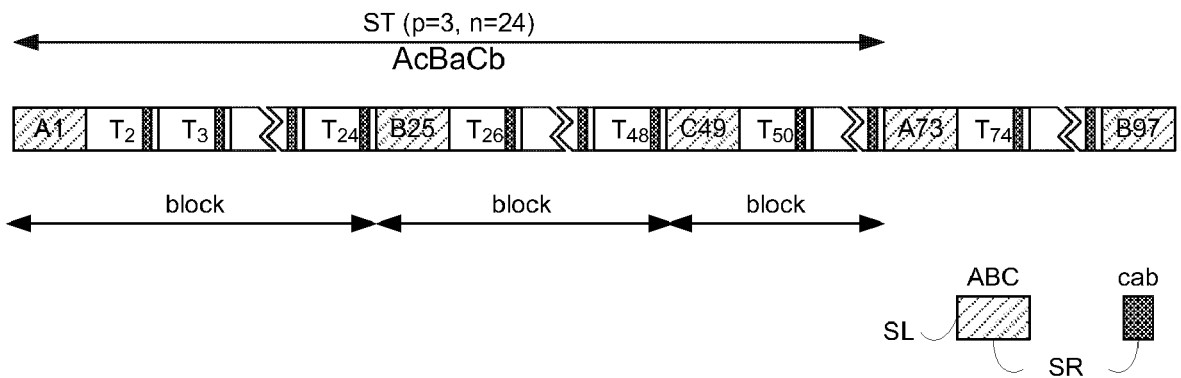
FIGS. 11, 12 and 13 show the structure of super-frames in an encrypted data stream with a slow synchronization according to the first association procedure for the first example and supplemented according to other embodiments of the invention by bit stealing from certain traffic frames and from certain blocks respectively.
Figure 12:
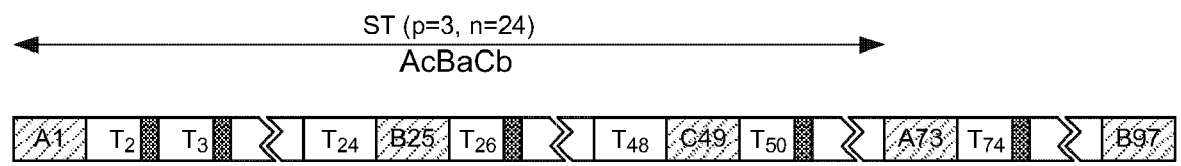
Figure 13:
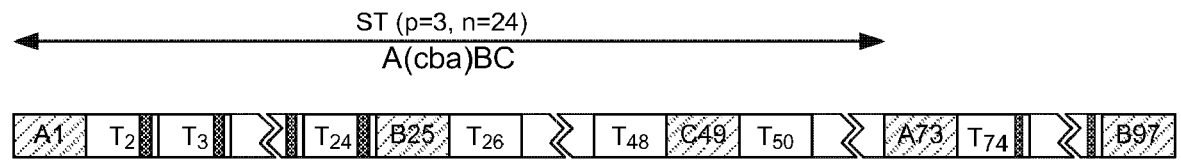

FIGS. 11, 12 and 13 which relate to the first association procedure as regards the slow synchronization parts (rightward hatched rectangles) are now referred to. However, everything specified hereinafter relating to the distribution of slow synchronization parts in the encrypted data stream FDC by stealing traffic bits is also valid for other examples and for the second association procedure.

In FIGS. 11, 12 and 13, the pre-existing slow synchronization depends on p=3 parties A, B and C derived from the synchronization management word SY according to the first example. The synchronization generator GS generates the additional synchronization parts a, b and c which are respectively similar to the slow synchronization parts A, B and C. However the additional synchronization parts a, b and c are themselves divided into sub-parts (cross-hatched rectangles) whose size is less than the size $S_{frame}$ of the traffic frames so that the fast synchronization is implemented only in an intermittent manner, for example in certain traffic frames, or in certain blocks of frames only in all or only some super-frames. As a function in particular of characteristics of the encrypted data stream to be preserved in the course of the transmission between the sender EM and the receiver RE, the fast synchronization can be minimized in terms of the number of frames affected by bit stealing so as to insert the additional synchronization parts.

According to FIG. 11, the additional synchronization parts c, a and b together exhibit as many sub-parts as traffic frames in a super-frame ST, i.e. p (n−1) sub-parts. The synchronization inserting unit UIS inserts into each traffic frame an additional synchronization sub-part in replacement for bits having predetermined ranks in the traffic frame. Thus the sub-parts replacing traffic bits in the traffic frames of the first, second and third blocks arise from fragmentations respectively of the additional synchronization parts c, a and b so as to insert the cryptographic synchronization sequence AcBaCb into the encrypted data stream FDC. The insertion of the parts c, a and b according to FIG. 11 partially preserves all the traffic frames, and the fast synchronization is possible in at least 25 frames and at most 47 frames.

The embodiment according to FIG. 12 differs from that of FIG. 11 by the number of sub-parts of the additional synchronization parts which is less than the number p(n−1) of traffic frames in a super-frame ST. The parts c, a and b are respectively distributed in replacement for bits having predetermined ranks in traffic frames which themselves have predetermined ranks in the blocks of the super-frame. According to the example in FIG. 12, bits at the end of the first three traffic frames following a slow synchronization part A1, B25, C49 in the three blocks are replaced with sub-parts of the respective additional synchronization parts c, a and b and the other traffic frames are maintained without any bit stealing.

With reference to FIG. 13 and in comparison to FIG. 11 or 12, instead of distributing the additional synchronization parts c, a and b in all or some traffic frames of all the blocks of a super-frame ST, the synchronization inserting unit UIS inserts sub-parts of the additional synchronization parts in replacement for bits having predetermined ranks in all or some traffic frames of a single block of a super-frame ST, for example the first block of the latter.

For the embodiments according to FIGS. 11, 12 and 13, when the source model of the data stream to be encrypted provides various bit classes as a function of their sensitivity with respect to the quality of the coding of the speech signal from which the encrypted data stream FDC arises, the bits or certain bits of the additional synchronization parts replace the least sensitive bits of traffic frames. The least sensitive bits in the traffic frames can be chosen from among those which contribute the least to the objective or subjective quality of the speech signal decrypted by the codec used in the receiver and which belong to a protection bit class predetermined for the channel coding between the sender and the receiver.

By way of illustration, for a bit rate B=2400 bit/s of the streams FDC and FDCS and parameters $Sf_{rame}$=54 bits, n=24 and p=3, the fast synchronization period is at best $T'_{sync}$=(n 1 $S_{frame}$)/B=0.54 s for 3.times.54 bits stolen from the first block so as to insert the additional synchronization parts according to FIG. 13, and at worst $T'_{sync}$=(n 2 $S_{frame}$)/B=1.08 s for n=54 stolen bits per block so as to insert the additional synchronization parts according to FIG. 11 or 12.

Whatever the embodiment, the cryptographic synchronization sequence interleaving the slow synchronization parts and the additional synchronization parts ensures both the slow synchronization SL and also the fast synchronization SR.

The method according to the invention finds applications in particular in the field of secure telecommunications. It is suited to cryptographic synchronization between fixed and/or mobile terminal equipments operating in interconnected dissimilar networks whose synchronization time constants differ.

A typical application relates to the cryptographic synchronization of data streams encrypted in real time between a fixed terminal and a mobile terminal. The fixed terminal is compatible only with a slow cryptographic synchronization. The mobile terminal furthermore requires a fast cryptographic synchronization, for example during an intercell handover so as not to interrupt a conversation established between the two terminals.

In an encrypted phone communication, if the source of the encrypted traffic is a vocoder implementing silence frames, the sender of the encrypted traffic data stream may require that the fast synchronization is inserted at least into super-frames or blocks corresponding to silence time slots.

In an encrypted communication involving plural interconnected dissimilar telecommunication networks, the method of the invention is advantageously implemented in all the networks requiring a fast synchronization, while preserving the slow synchronization necessary in the other interconnected networks. For this purpose, the method of the invention is implemented in any terminal connected to an interconnected network requiring a fast synchronization, such as for example a mobile radio terminal in a cellular radiocommunication network. The method is also implemented in telecommunication equipments effecting an interoperational gateway between dissimilar networks, for example a gateway between a cellular radiocommunication network and a fixed telecommunication network such as a switched telecommunication network or an internet or intranet type packet network. Thus, the encrypted data stream originating from a terminal with slow synchronization, for example a terminal of a fixed network of ISDN type, can be augmented by additional frame stealing ensuring the fast synchronization, for the benefit of terminals requiring both slow synchronization and also fast synchronization, such as for example a mobile terminal of a cellular radiocommunication network. Conversely, the stream containing the slow synchronization frames and the fast synchronization frames sent by a fast terminal is processed both by the receiver of a terminal with fast synchronization which recognizes fast synchronization and slow synchronization, and also by the receiver of a terminal with slow synchronization which recognizes slow synchronization and processes the fast synchronization frames as traffic frames which have undergone interference.

The invention claimed is:

1. A synchronization method applied to a data stream structured into super-frames each formed of blocks of frames, each block in a super-frame comprising at least one traffic frame, said method including decomposing a synchronization management word into slow synchronization parts; inserting said slow synchronization parts respectively in blocks of said super-frame; and inserting additional synchronization parts replacing traffic frame bits in the super-frame, each additional synchronization part including at least a low proportion different part of respective one of said slow synchronization parts.

2. A method according to claim 1, wherein at least one additional synchronization part dependent on the end of the synchronization management word is inserted into the super-frame after a slow synchronization part dependent on the start of the synchronization management word.

3. A method according to claim 1, wherein one of said additional synchronization parts replaces a traffic frame in a block of the super-frame.

4. A method according to claim 1, wherein the additional synchronization parts respectively replace traffic frames in the blocks of the super-frame, at a rate of one traffic frame per block.

5. A method according to claim 4, wherein the traffic frames replaced with the additional synchronization parts are temporally situated proximate the middle of the blocks of the super-frame.

6. A method according to claim 1, wherein one of the additional synchronization parts replaces predetermined bits in predetermined traffic frames in a block of the super-frame.

7. A method according to claim 1, wherein the additional synchronization parts have sub-parts which have a size less than the size of the traffic frames and which are distributed in replacement for predetermined bits in traffic frames in the super-frame.

8. A method according to claim 1, wherein the additional synchronization parts have sub-parts which have a size less than the size of the traffic frames and which are distributed in replacement for bits in traffic frames having predetermined ranks in predetermined blocks of the super-frame.

9. A method according to claim 1, wherein the additional synchronization parts have sub-parts which have a size less than the size of the traffic frames and which are distributed in replacement for bits in traffic frames included in a block of the super-frame.

10. A method according to claim 6, wherein bits in traffic frames of the super-frame replaced with the additional synchronization parts are least sensitive bits of traffic frames.

11. A method according to claim 1, comprising reconstituting the synchronization management word by observing consecutive blocks of a received super-frame in number strictly less than the number of blocks in the super-frame.

12. A method according to claim 1, further comprising reconstituting the synchronization management word by observing consecutive blocks of a received super-frame strictly fewer in number less than half the number of blocks in the super-frame.

13. A synchronization sequence in a super-frame of a data stream structured into super-frames each formed of digital blocks of digital frames, each block in a super-frame comprising a slow synchronization part and at least one traffic frame, the slow synchronization parts in the super-frame resulting at least from a decomposition of a synchronization management word and being stored in a memory, said synchronization sequence comprising additional synchronization parts stored in said memory means and replacing traffic bits in said super-frame, each additional synchronization part including at least a low proportion different part of respective one of said slow synchronization parts.

14. A synchronization sequence according to claim 13, of type AcBaCb in which a, b and c denote additional synchronization parts respectively including at least a low proportion different part of the slow synchronization parts A, B and C and interleaved with the slow synchronization parts A, B and C in the super-frame.

15. A synchronization sequence according to claim 13, of type AcBdCaDb or AdBaCbDc in which a, b, c and d denote additional synchronization parts respectively including at least a low proportion different part of the slow synchronization parts A, B, C and D and interleaved with the slow synchronization parts A, B, C and D in the super-frame.

16. A sender able to send a data stream structured into super-frames each formed of blocks of frames, each block in a super-frame comprising at least one traffic frame, said sender including means for inserting slow synchronization parts of a synchronization management word in the super-frame; and means for inserting additional synchronization parts replacing traffic frame bits in the super-frame, each additional synchronization part including at least a low proportion different part of respective one of said slow synchronization parts.

17. A receiver able to receive a data stream structured into super-frames each formed of blocks of frames, each block in a super-frame comprising a slow synchronization part and at least one traffic frame, the slow synchronization parts in the super-frame resulting at least from a decomposition of a synchronization management word, said receiver comprises means for reconstituting the synchronization management word by observing consecutive blocks in a received super-frame in which additional synchronization parts replace traffic frame bits in the super-frame, each additional synchronization part including at least a low proportion different part of respective one of said slow synchronization parts.

* * * * *